P. A. GLADWIN.
Corn Sheller.
No. 1,567.
Patented April 24, 1840.
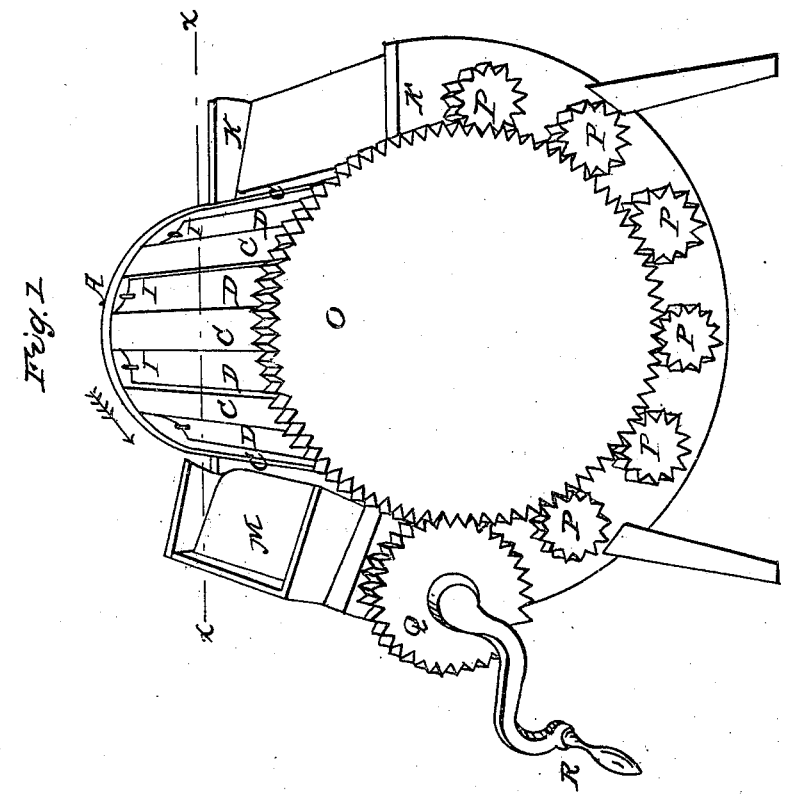
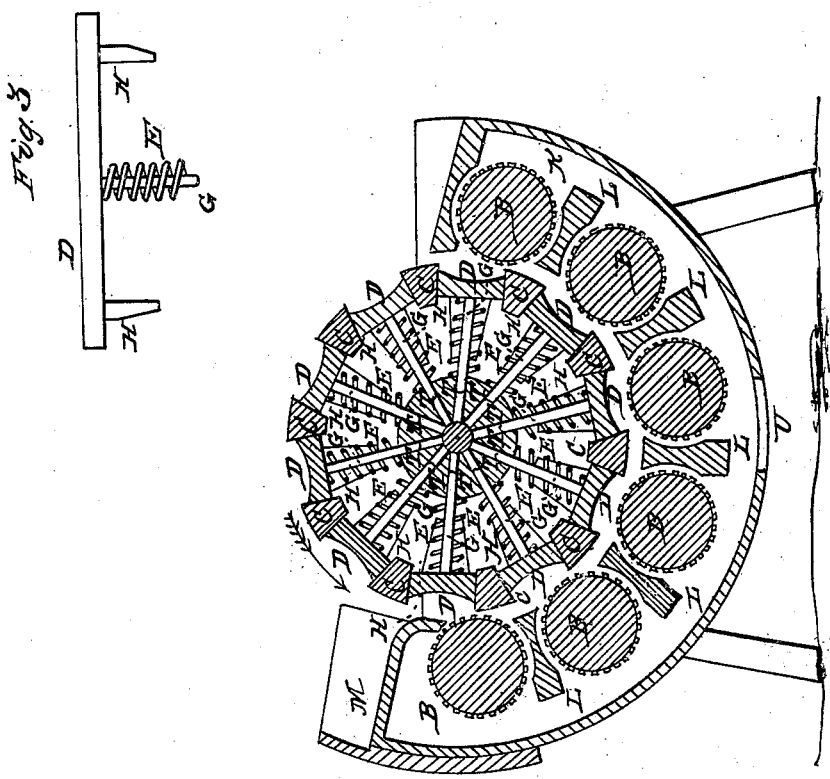

UNITED STATES PATENT OFFICE.

PORTER A. GLADWIN, OF CHESTER, CONNECTICUT.

CORN-SHELLER.

Specification of Letters Patent No. 1,567, dated April 24, 1840.

*To all whom it may concern:*

Be it known that I, PORTER A. GLADWIN, of Chester, Middlesex county, State of Connecticut, have invented a new and useful Improvement in Machines for Shelling Corn, which is described as follows, reference being had to the annexed drawings of the same, making part of this specification.

Figure 1 represents a perspective view of the machine. Fig. 2 is a sectional view through the center of the machine at the dotted line *x x* of Fig. 1. Fig. 3 one of the spring beds, coiled spring, and stops.

Similar letters refer to similar parts in the figures.

This machine consists of a hollow revolving cylinder A for carrying the ears of corn to be shelled through the concave of revolving roughened shelling rollers B (hereafter described) which cylinder consists of two round heads connected together by a series of parallel slats C mortised into the heads around their peripheries at suitable distances apart according to the diameter of the ears of corn which are received between said slats which may, from their use, be termed carriers as they perform the office of carrying around the ears of corn against the shelling rollers B; and between these carriers C are placed movable concave spring beds D against which the ears of corn rest in passing through the concave of shelling rollers and which beds recede from or advance toward the concave according to the sizes of ears received between the carriers which effect of contraction or extension being produced by placing revolving coiled springs E between them and the periphery of the axle F passing through the center of the hollow cylinder and which springs are kept in their proper places by means of round pins G let permanently into the backs of the concave beds from which they extend toward the center of the cylinder passing through the coiled springs and entering apertures T in the axle sufficiently large to allow them to work freely therein as the beds recede (the springs revolving around on said pins) and for the purpose of preventing said beds receding too far stops H are fixed to the backs of the beds which strike against the axle and thus arrest their inward movement, their outward movement being arrested by pins I inserted in the heads of the cylinder against which the beds strike when sufficiently extended. The axle F before mentioned passing through the center of the cylinder turns in suitable boxes in the side of a suitable frame or semi-circular box K for containing and supporting the parts hereafter described. In this semi-circular concave, which is boxed up tight on the ends, top, and semi-circumference, except the space in the top for the cylinder to turn in and for the introduction of the ears of corn and for the escape of the cobs and a space U in the bottom of the concave casing for the escape of the kernels of corn which descend between the shelling rollers and semi-circular concave casing below them. In this semi-circular box or casing are arranged a number of parallel rollers B whose gudgeons pass through the sides of the box and in whose peripheries are inserted spiral rows of pins or iron studs for stripping the kernels of corn from the cob as said rollers revolve which is effected by gearing in the manner hereafter described. Between these rollers are fastened permanent parallel bars L for preventing the ears of corn descending between the rollers.

On top of the concave box and in front of the cylinder is placed a hopper M for conducting the ears of corn to the spring beds between the carriers of the cylinder. On the end of the axle of the cylinder projecting beyond the end of the concave box is fixed a large cog wheel O which works into or engages with small pinions P. On the ends of the axles of the rollers extending outside the concave box for turning them, simultaneously, but at a much greater speed than that of the cylinder the reduced speed of which being produced by a small cog wheel Q mashing into the large cog wheel and turned by a crank R by hand or other power, the cylinder and rollers turning toward each other.

When the machine is in operation and an ear of corn is placed in the hopper M whose bottom is inclined at an angle of about 15 degrees it descends into one of the concave beds D of the cylinder between the parallel slats or carriers C which convey it around to the concave of rapidly revolving roughened rollers B which instantly strip the kernels of corn from the cob while corn descends and falls through the aperture U in the bottom of the concave box and the cob is thrown out at the rear end of the machine by the sudden extension of the spring E under the bed and thus the cob is prevented from being carried around by the cylinder and in this manner every ear of corn is treated—there being four or five or more ears of corn in the machine at once and all operated upon at the same time. A revolving fan may be placed below the machine for blowing the chaff from the corn.

What I claim as my invention and desire to secure by Letters Patent is—

The forming of the concave with a number of shelling rollers arranged in the manner herein set forth, also the arranging of the spring beds in the carrying cylinder instead of the concave as herein described.

PORTER A. GLADWIN.

Witnesses:
  HORATIO BURKE,
  SEDLEY SNOW.